Aug. 26, 1930.  C. G. AMBUSH  1,773,928

BUMPER

Filed Aug. 7, 1929

Charles G. Ambush,
INVENTOR

BY Victor J. Evans
ATTORNEY

Patented Aug. 26, 1930

1,773,928

UNITED STATES PATENT OFFICE

CHARLES G. AMBUSH, OF ROXBURY, MASSACHUSETTS

BUMPER

Application filed August 7, 1929. Serial No. 383,998.

My present invention has reference to an improved shock absorber for automobiles and like vehicles, and my object is the provision of a shock absorber of a construction and association of elements whereby shock incident to an impact of force against the bumper will be absorbed so that liability of injury to the object contacted and likewise liability of injury to the bumper will be materially decreased if not entirely overcome.

To the attainment of the foregoing the invention consists in the construction of elastic bumpers hereinafter described and definitely claimed.

Figure 1:
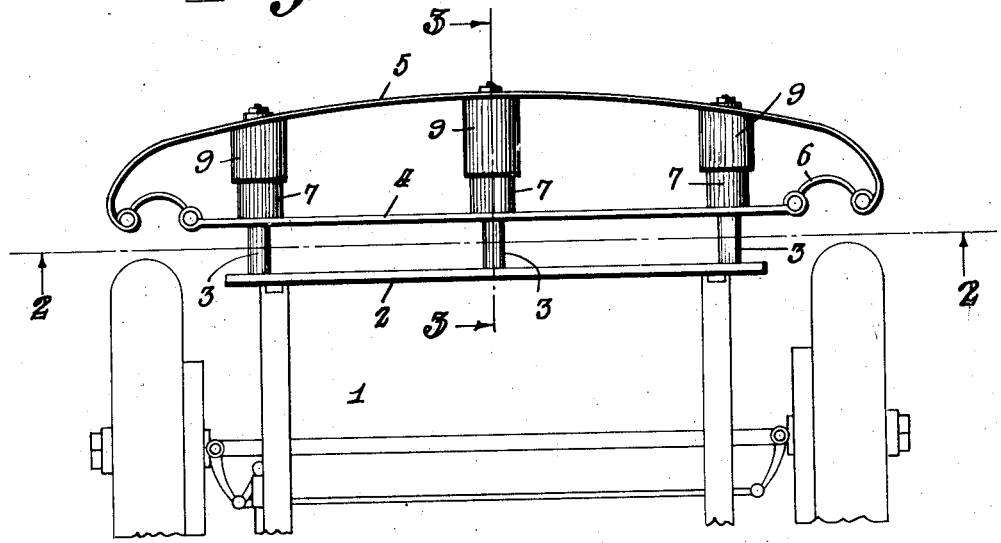
Figure 1 is a top plan view showing my improvement in applied position.
Figure 2:
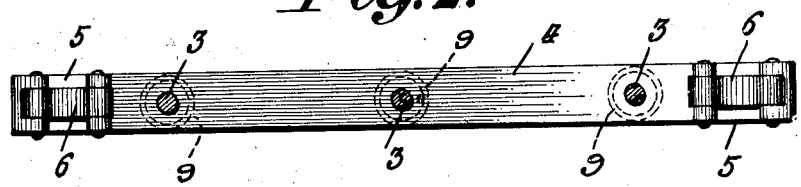
Figure 2 is a sectional view approximately on the line 2—2 of Figure 1.
Figure 3:
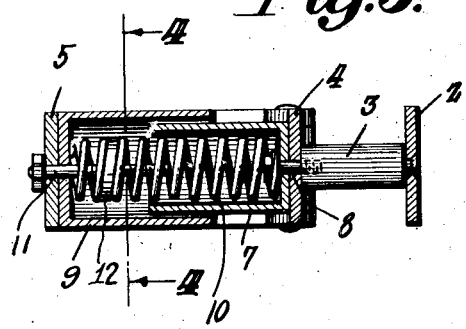
Figure 3 is a sectional view approximately on the line 3—3 of Figure 1.
Figure 4:
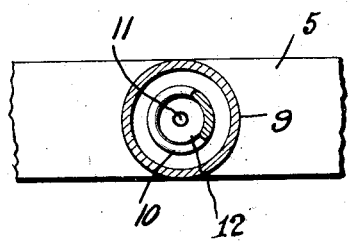
Figure 4 is a sectional view on the line 4—4 of Figure 3.

In Figure 1 of the drawings I have illustrated a sufficient portion of the front of an automobile frame to illustrate the application of my improvement thereon.

As disclosed by the said figure I fixedly secure to the front ends of the side members of the automobile frame 1 a plate 2. To the outer face of this plate there are fixed outwardly extending posts 3. It is to be noted that one of the posts is arranged at the center of the plate 2 and the others adjacent to the ends of the said plate. The outer ends of the posts have fixedly secured thereto the inner bar 4 of the bumper. The outer bar 5 of the bumper is arched in plan and is of a greater length than the inner bar 4. Pivotally secured to the inwardly rounded ends of the outer bar 5 and to the ends of the inner bar 4 there are outwardly arched or curved links 6. Fixedly secured to the inner bar 4, in a line with each of the posts 3 there are comparatively short tubes 7. The securing means 8 for these tubes pass through the inner bumper bar 4 and enter the posts 3 for holding the said bar 4 on the posts.

Fixedly secured on the inner face of the outer arched bumper bar 5 there are other tubes 9. These tubes receive therein the ends of the tubes 7. There is disposed in each of the telescopic tubes 7 and 9 a coiled spring 10. The bolt members 8 secure the inner ends of the springs to the inner tubes 7, while bolt members 11 pass through the outer bumper bar 5 and the ends of the tubes 9 and are arranged centrally between the convolutions of the springs 10. These bolts are also screwed through washers or nuts 12 that are disposed between certain of the convolutions of the springs 10 and it will be obvious that by adjusting the nuts the tension of the springs 10 may be regulated. My improvement embodies a greater amount of yieldability of elasticity than the ordinary bumper so that an object contacted by the outer bar 5 will cause the said bar to move against the pressure of the springs 10, with the result that the bumper will not inflict serious injury on such articles nor will the force of contact inflict injury on the motor.

The construction and advantages of the improvement will, it is thought, be understood and appreciated so that further detailed description will not be required, it being merely necessary to state that I do not wish to be limited to the precise details herein set forth and hold myself entitled to such changes as fairly fall within the scope of the claim.

Having described the invention, I claim:

A bumper for automobiles, including as elements, a supported plate having posts extending therefrom, an inner straight bumper bar, an outer arched bumper bar, outwardly curved links pivotally connecting the ends of the bumper bars, short tubes secured on the outer face of the straight bumper bar and securing means for said tubes holding the said bar on the posts, other short tubes on the inner face of the outer bumper bar receiving the first mentioned tubes therein, a coil spring in each of the telescopically associated tubes having their inner convolutions secured to the inner tubes by the fastening means and a bolt member freely passing through the outer bar and received in the outer tubes and disposed centrally with respect to the convolutions of the springs and nut members on said bolts received respectively between certain of the convolutions of the springs.

In testimony whereof I affix my signature.

CHARLES G. AMBUSH.